United States Patent
Bodin

(10) Patent No.: US 6,907,789 B2
(45) Date of Patent: Jun. 21, 2005

(54) SENSOR PACKAGE

(75) Inventor: Joel J. Bodin, Chanhassen, MN (US)

(73) Assignee: Honeywell International Inc., Morristown, NJ (US)

(*) Notice: Subject to any disclaimer, the term of this patent is extended or adjusted under 35 U.S.C. 154(b) by 354 days.

(21) Appl. No.: 10/140,267

(22) Filed: May 6, 2002

(65) Prior Publication Data
US 2003/0205091 A1 Nov. 6, 2003

(51) Int. Cl.[7] .................................................. G01L 9/00
(52) U.S. Cl. .............................. 73/753; 73/756; 73/727
(58) Field of Search .......................... 73/753, 700, 756, 73/706, 717–727, 757; 257/697–699, 774, 433

(56) References Cited

U.S. PATENT DOCUMENTS

| 2,842,686 A | | 7/1958 | Musser et al. ................ 310/8.7 |
| 4,662,226 A | * | 5/1987 | Wang ............................ 29/454 |
| 4,890,498 A | | 1/1990 | Dobler et al. ................. 76/727 |
| 5,186,055 A | | 2/1993 | Kovacich et al. ............. 73/727 |
| 5,595,939 A | * | 1/1997 | Otake et al. .................. 438/51 |
| 5,874,679 A | | 2/1999 | Sokn ............................ 73/706 |
| 5,948,988 A | | 9/1999 | Bodin .......................... 73/706 |
| 5,996,419 A | * | 12/1999 | Sokn ............................ 29/511 |
| 6,091,022 A | | 7/2000 | Bodin ....................... 174/52.5 |
| 6,450,039 B1 | * | 9/2002 | Masuda ....................... 73/756 |

FOREIGN PATENT DOCUMENTS

EP          0553725 A2     8/1993

* cited by examiner

Primary Examiner—Edward Lefkowitz
Assistant Examiner—Jermaine Jenkins
(74) Attorney, Agent, or Firm—McDonnell Boehnen Hulbert & Berghoff

(57) ABSTRACT

A sensor package is disclosed. The sensor package includes a housing that has a recess and a sealing member epoxied within the recess of the housing. The housing also has small EDM holes to allow conductive output wires to feed through the housing. The sealing member provides a seal for the holes of the conductive outputs of the sensor package. The sensor package further includes a sensing die, which detects a pressure, and outputs an electrical signal through the output wires.

11 Claims, 5 Drawing Sheets

SENSOR PACKAGE

BACKGROUND

A. Field of Invention

The present invention relates to sensor packages, and more particularly, to high-pressure sensor packages.

B. Description of Related Art

Solid-state pressure sensors, such as solid-state gas or fluid pressure sensors, generally require a hermetically sealed package, i.e., fully sealed package, in order to accurately detect a pressure. Typical solid-state pressure sensors have conductive pins extending from a sensing die of the pressure sensor package through relatively large holes of the package. In addition, typical pressure sensors may have cylindrical glass headers to provide a seal within the holes of the package and the conductive pins. However, glass headers may not withstand high temperatures. For example, exposure to high temperatures may cause the metal packaging material of the pressure sensor to expand, and therefore weaken or destroy a glass-to-metal seal that was initially intact. As a result, the pressure sensor may not be able to detect an applied pressure as desired. Also, in some instances, a glass-to-metal seal can degrade over time, which may weaken or destroy the glass-to-metal seal.

In addition, a pressure sensor may be exposed to extreme pressures. Existing sensors that have glass-to-metal seals may not endure high pressures because the glass-to-metal seals may crack and fail due to high pressure exposure. For example, typical glass-to-metal seals expose a large surface area of the seal to the applied pressure. The exposure of the large surface area of the glass-to-metal seal allows the glass headers to be pushed out of the housing of the pressure sensor due to a large force from the applied pressure. As a result, the conductive pins may become disconnected from the pressure sensor and the pressure sensor may not operate correctly, if at all.

Thus, it is desirable to provide a device for detecting pressure that can withstand exposure to high pressures and high temperatures to improve precision and accuracy of a pressure sensor.

SUMMARY OF THE INVENTION

In an exemplary embodiment, a sensor package is provided that has a housing with a recess formed therein. The recess defines an interior perimeter and a seal interface surface. The sensor package also has a sealing member sealingly attached to the seal interface surface within the recess and at least one lead passing through the housing and the sealing member.

In another embodiment, a sensor package is provided that has a housing with a recess formed therein which defines an interior perimeter and a seal interface surface. The housing also has at least one hole extending through the seal interface surface of the housing. The sensor package also has a sealing member sealingly attached to the seal interface surface within the recess positioned to cover the at least one hole. The package also includes a diaphragm positioned between the sealing member and the interior perimeter of the recess. The sensor package may also have a sensing die positioned within the recess to detect a pressure.

The sensor package may be used to measure a high pressure while being exposed to a high temperature. The materials chosen for the package may determine limits on the amount of exposure to temperature and pressure. For example, a thicker package may be able to sustain higher pressures.

These as well as other features and advantages of the present invention will become apparent to those of ordinary skill in the art by reading the following detailed description, with appropriate reference to the accompanying drawings.

BRIEF DESCRIPTION OF FIGURES

Exemplary embodiments of the invention are described below in conjunction with the appended drawing figures, wherein like reference numerals refer to like elements in the various figures, and wherein.

DETAILED DESCRIPTION OF EXEMPLARY EMBODIMENTS

In an exemplary embodiment, a sensor package is presented that may withstand high pressures, high temperatures, and other effects that could degrade the package's integrity. The sensor package may have electrical pin-outs or leads positioned through holes that are created through a recess of the package. The package also may have a ceramic block positioned within the recess of the package to seal the holes through which the leads pass. A sensing die may be positioned within the package to detect an applied pressure. An accurate measurement can be obtained due to the seal created by the ceramic block. The ceramic block may fully cover the holes through which the leads pass, whereas in existing sensor packages, the feed-through holes which contain the leads have glass-to-metal seals that are exposed to the applied pressure, which can weaken or destroy the glass-to-metal seals.

Figure 1:
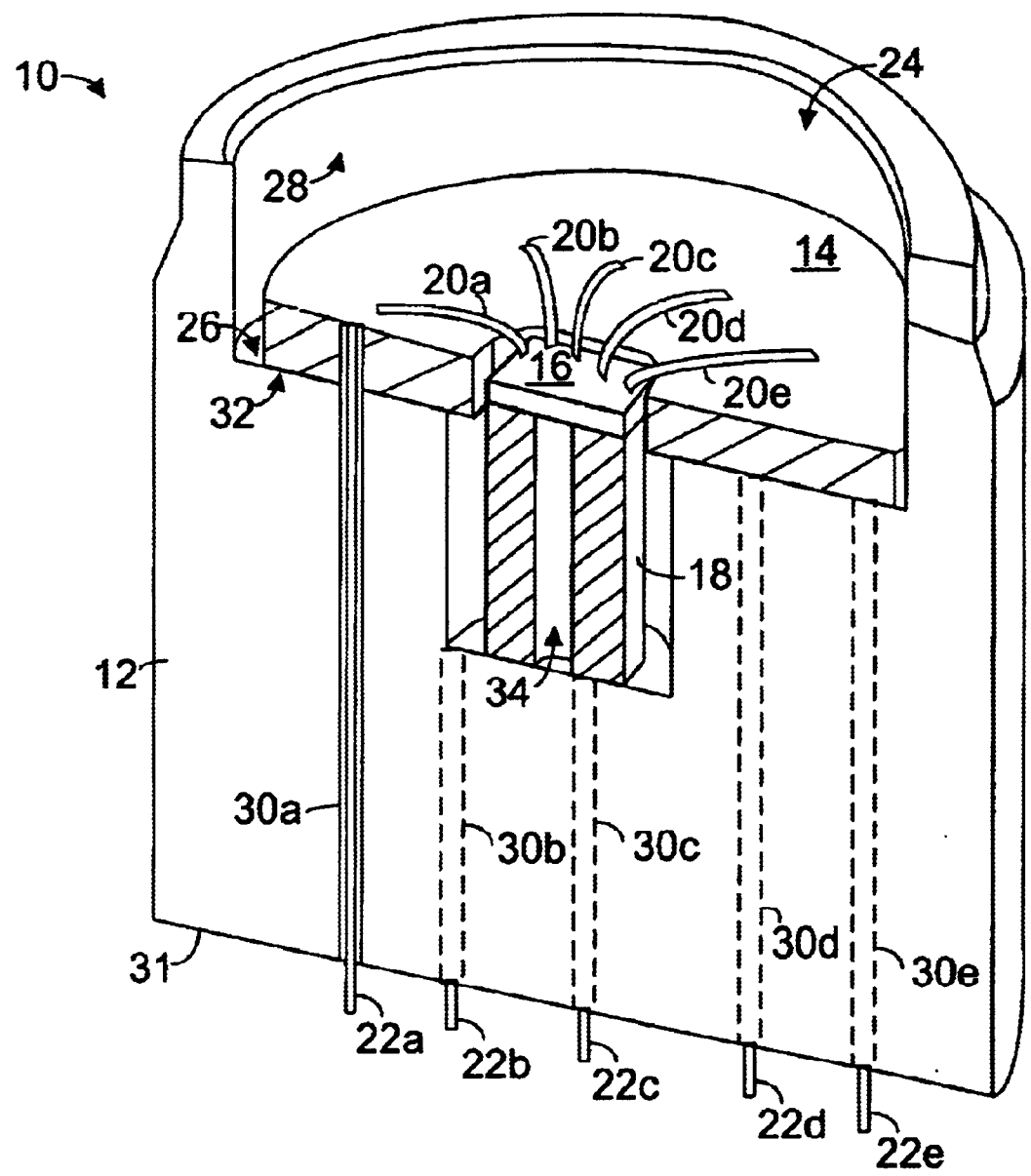
FIG. 1 illustrates one embodiment of a sensor package.

Referring to FIG. 1, an exemplary embodiment of a sensor package 10 is illustrated. While FIG. 1 illustrates the sensor package 10, other packages and/or sensors may be used as well, such as, a temperature sensor. In addition, it should be understood that the sensor package 10 illustrated in FIG. 1 and other arrangements described herein are set forth for purposes of example only, and other arrangements and elements can be used instead and some elements may be omitted altogether, depending on manufacturing and/or consumer preferences.

By way of example, the sensor package 10 has a housing 12, a sealing member 14, a sensing die 16, a mounting block 18, bond wires 20a–20e, and leads 22a–22e. The housing 12 has a recess 24 which defines a seal interface surface 26 and an interior perimeter 28. The recess 24 may be a cavity or indentation within the housing 12. The seal interface surface 26 has holes 30a–30e which extend to a base 31 of the housing 12 through which leads 22a–22e pass. As such, the leads 22a–22e are substantially perpendicular to the seal interface surface 26. The holes 30a–30e allow leads 22a–22e to feed through to a bottom surface of the sealing member 14. The seal interface surface 26 may include more or fewer holes than are illustrated in FIG. 1 to incorporate more or fewer leads. In the exemplary embodiment, the holes 30a–30e may be electronic discharge machine (EDM) holes, although alternative techniques are possible.

The housing 12 may be made of steel or other materials capable of withstanding high pressures and high temperatures. For example, the housing 12 could be comprised of a material having a high thermal stability and thermal shock resistance. Although housing 12 is illustrated as being cylindrical in shape, alternative configurations are possible as well.

The sealing member 14 may be arranged in the recess 24 and secured to the seal interface surface 26 using an epoxy bond 32, although alternative adhesives may be used as well, such as a polyurethane glue or a polyvinyl glue. The sealing member 14 is epoxied to the seal interface surface 26 to provide a seal for the holes 30a–30e of the housing 12. The holes 30a–30e of the housing 12 may also pass through the sealing member 14 and the leads 22a–22e may pass through the holes 30a–30e. The sensing die 16 is mounted on the mounting block 18 within the recess 24. The mounting block 18 may be secured to the housing 12. Alternatively, the mounting block 18 may be formed integrally in the housing 12. The mounting block 18 may have a central opening 34 extending through the block 18, as illustrated in FIG. 1, to allow for absolute or gauge pressure. For example, the central opening 34 may perform as a vacuum, and the sensing die 16 may then measure absolute pressure measurements (i.e., pounds per square inch absolute PSIA). Alternatively, the central opening 34 may be exposed to atmospheric pressure to enable the sensing die 16 to measure gauge pressure measurements (i.e., pounds per square inch gauge PSIG).

Figure 2:
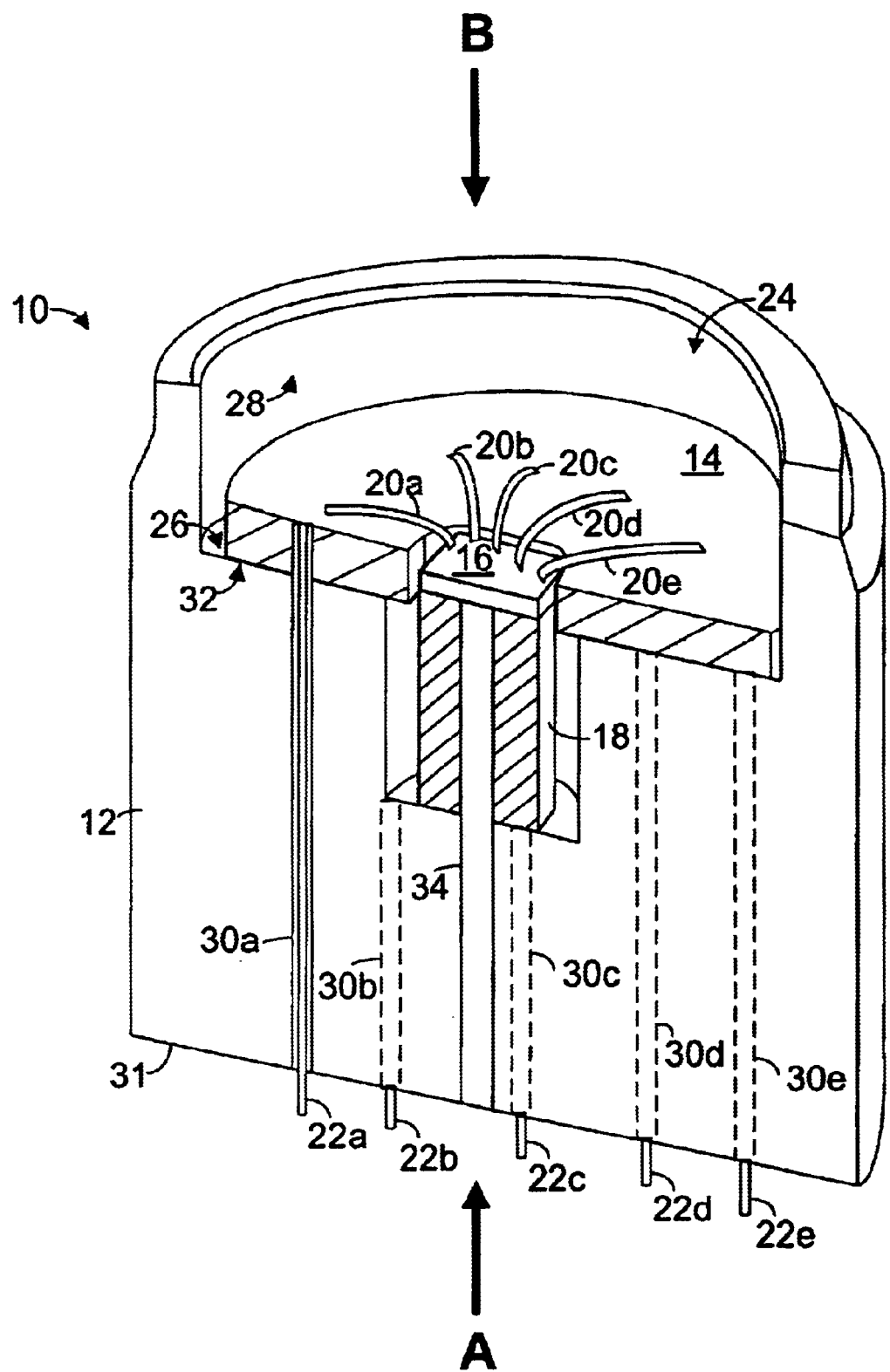
FIG. 2 illustrates operation of the sensor package of FIG. 1.

In another embodiment, the central opening 34 may extend through the housing 12 to the base 31. Referring to FIG. 2, pressure may enter the central opening 34 from the base 31, as illustrated by arrow A, as well as through the recess 24, as illustrated by arrow B. The sensing die 16 may then detect a difference in the pressures induced from opposite ends (i.e., pounds per square inch differential PSID), which is similar to PSIG.

The sensing die 16 may be a microcircuit or micro-electro-mechanical system including electrical components, mechanical components, or additional elements as necessary for detecting pressure. The sensing die 16 converts an applied pressure to a proportional electrical signal. The sensing die 16 may include a flexible diaphragm construction with strain gauges either bonded to, or diffused into the diaphragm, acting as resistive elements. Under a pressure-induced strain, the resistive values change.

In another embodiment, the sensing die 16 may have a capacitive sensor in which a pressure diaphragm is represented as one plate of a capacitor that changes capacitance under a pressure-induced displacement. In still another embodiment, the sensing die 16 is a piezoresistive pressure sensor, or silicon cell. The piezoresistive pressure sensor may have a micro-machined silicon diaphragm with piezoresistive strain gauges diffused into the sensor, fused to a silicon or glass backplate. Still other variations of the sensing die 16 are possible as well.

In the exemplary embodiment, the sensing die 16 is wire bonded or spot welded to the leads 22a–22e using bond wires 20a–20e. The leads 22a–22e extend from the bond wires 20a–20e through the holes 30a–30e of the housing 12. The leads 22a–22e may include an insulation material, such as polyvinyl chloride (PVC), or other materials to prevent conduction between the leads 22a–22e and the housing 12. However, if the housing 12 is non-conductive, the insulation material may be omitted.

In the exemplary embodiment, the sealing member 14 is a ceramic block, used to provide a seal for the holes 30a–30e. As illustrated in FIG. 1, the sealing member 14 may have an opening to allow the sensing die 16 to be mounted on the mounting block 18. Alternatively, the sensing die 16 may be mounted directly on the sealing member 14, and the opening of the sealing member 14 and the mounting block 18 may be omitted.

Figure 3A:
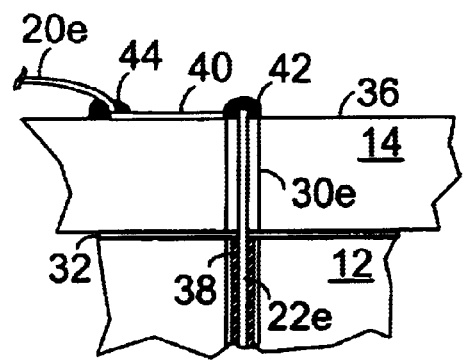
FIGS. 3A–3B illustrate a portion of FIG. 1.

In the exemplary embodiment, the bond wires 20a–20e may be conductively coupled to the leads 22a–22e using the sealing member 14. As illustrated in FIG. 3A, solder connections may connect the bond wires 20a–20e and the leads 22a–22e. The holes 30a–30e may be extended through the housing 12 and also through the sealing member 14 to allow the leads 22a–22e to extend to a top surface 36 of the sealing member 14. Insulation material of leads 22a–22e, such as insulation 38, may not extend to the top surface 36 of the sealing member 14. Conductive traces, such as conductive trace 40, may be on the top surface 36 of the sealing member 14. The conductive traces may be similar to those found on a printed circuit board (PCB), and can connect the bond wires 20a–20e with the leads 22a–22e. As illustrated in FIG. 3A, lead 22e is conductively coupled to conductive trace 40 with solder 42. Bond wire 20e is also electrically coupled to the conductive trace 40 through connection 44, which may be a solder or weld connection, thereby creating an electrical connection between bond wire 20e and lead 22e through conductive trace 40. Although only one electrical connection is shown in FIG. 3A for ease of illustration, each lead 22a–22e and bond wire 20a–20e may be conductively coupled through a conductive trace.

Solder 42 may seal the hole of the sealing member 14 from an applied pressure to the top surface 36 of the sealing member 14. In addition, the epoxy bond 32 between the sealing member 14 and the seal interface surface 26 seals the hole 30e (and also holes 30a–30d) of the housing 12. Solder 42 may be a conventional tin/lead eutectic solder joint. Connection 44 may be a spot weld connection, which is a high yield interconnect that incorporates heat and ultrasonic energy to form a metallurgical bond. Connection 44 may use a high-purity gold wire to form a ball bond or stitch bond between the bond wires 20a–20e and the conductive traces. Because the holes 30a–30e of the housing 12 and the holes of the sealing member 14 are small, solder connections, such as solder 42, that are exposed to applied pressures, only have a small surface area exposed. As a result, only a small force is applied to the solder connection 42, which decreases the possibility of the solder seal failing.

In the exemplary embodiment, the holes 30a–30e of the housing 12 which may extend through the sealing member 14 may be approximately 0.020 inches in diameter to reduce the force applied onto the solder connections between the bond wires 20a–20e and the leads 22a–22e. Because pressure is a force applied over an area, an applied force is directly proportional to area multiplied by an applied pressure. As an illustration, an applied pressure of 10 PSI over a hole having a 0.020 inch diameter may result in a 0.014 N force applied to the hole. Such a small force is unlikely to damage the solder connections between bond wires 20a–20e and leads 22a–22e. In comparison, existing pressure sensor packages may have 0.05–0.08 inch diameter holes, and the same 10 PSI pressure applied would result in approximately a 0.09 N force, which is about 7 times larger than the example illustrated above.

The sealing member 14 provides a seal between the holes 30a–30e of the housing 12 due to the epoxy seal 32 between the sealing member 14 and the seal interface surface 26. The epoxy seal 32 allows an enclosed area to be formed between an applied pressure and the sealing member 14. A sealed or enclosed area may be necessary for the sensing die 16 to derive an accurate measurement of an applied pressure. As an example, a pressure may be applied to the top of the sensing die 16 by a gas. The gas may apply a force onto the sensing die 16, and the sensing die 16 may derive a measurement of the downward force of the gas. As the downward force of the gas increases, the sealing member 14 may be further compressed upon the seal interface surface 26, and the epoxy bond 32 between the seal interface surface 26 and the sealing member 14 may also become further compressed and seal the holes 30a–30e of the housing 12. Without a sealed area between the recess 24 and the holes 30a–30e, a portion of the gas may exit the sensor package 10 and the resulting force exerted onto the sensing die 16 may be less than the total applied force on the sensor package 10. Therefore, an accurate measurement of the applied pressure of the gas may not be obtained.

Figure 3B:
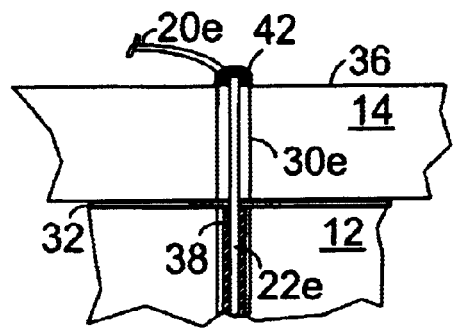

In another exemplary embodiment, as illustrated in FIG. 3B, the conductive trace 40 may be omitted and the bond wires 20a–20e (for ease of illustration, only bond wire 20e and lead 22e are shown) may extend from the sensing die 16 to the leads 22a–22e at the top surface 36 of the sealing member 14. The bond wires 20a–20e may be soldered to the leads 22a–22e through the solder connection 42. This may reduce manufacturing processes since the connection 44 may be omitted.

Figure 3C:
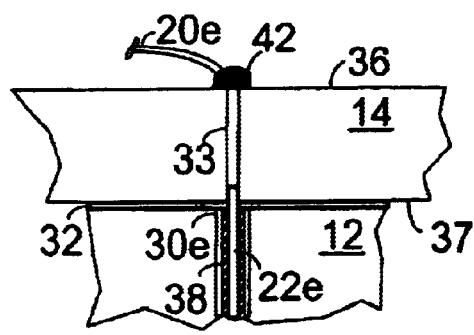

In yet another embodiment, as illustrated in FIG. 3C, the sealing member 14 may have plated-through holes, such as plated-through hole 33, which conductively couple the bond wires 20a–20e to the leads 22a–22e. The bond wires 20a–20e may extend from the sensing die 16 to the top surface 36 of the sealing member 14 where they may be soldered or attached to the top of the plated-through holes. The leads 22a–22e may extend through the holes 30a–30e to a bottom surface 37 of the sealing member 14 and contact the plated-through holes as well. In this embodiment, the plated-through holes perform as a conductor from the bond wires 20a–20e to the leads 22a–22e.

Figure 4:
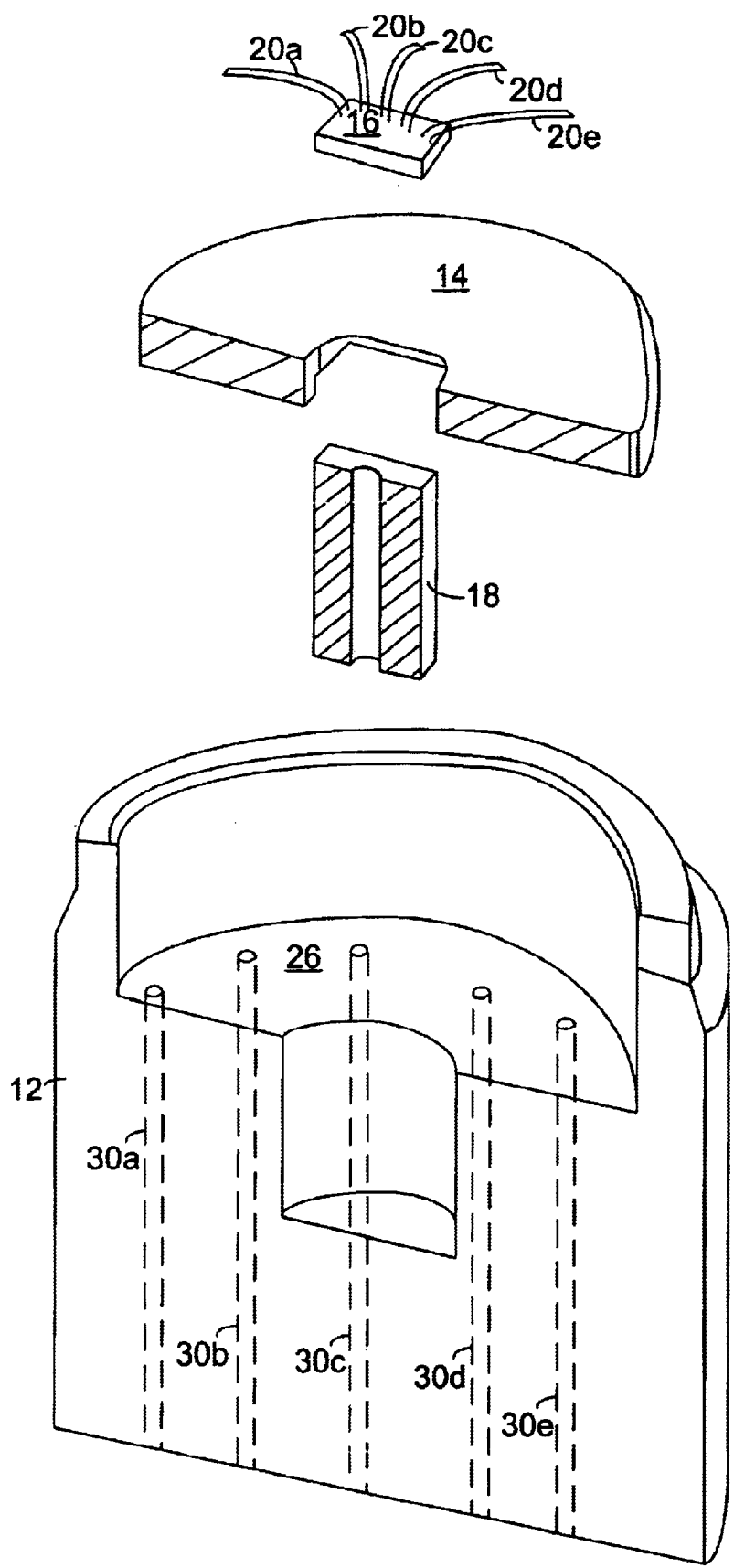
FIG. 4 illustrates a cross-sectional view of the sensor package of FIG. 1.

Referring to FIG. 4, a cross-sectional view of an assembly of the sensor package 10 of FIG. 1 is illustrated. Initially, the holes 30a–30e are created through the seal interface surface 26 of the housing 12 using an EDM process. Positioning of the holes 30a–30e can be selected according to a desired position of the leads 22a–22e. The sensing die 16 is attached to the mounting block 18, and the assembly is then positioned within a central portion of the housing 12. The leads 22a–22e may be inserted in the holes 30a–30e and the sealing member 14 may be attached to the seal interface surface 26 of the housing 12 using epoxy. The bond wires 20a–20e are then conductively connected to the sensing die 16 and to the sealing member 14 and/or to the leads 22a–22e.

Figure 5:
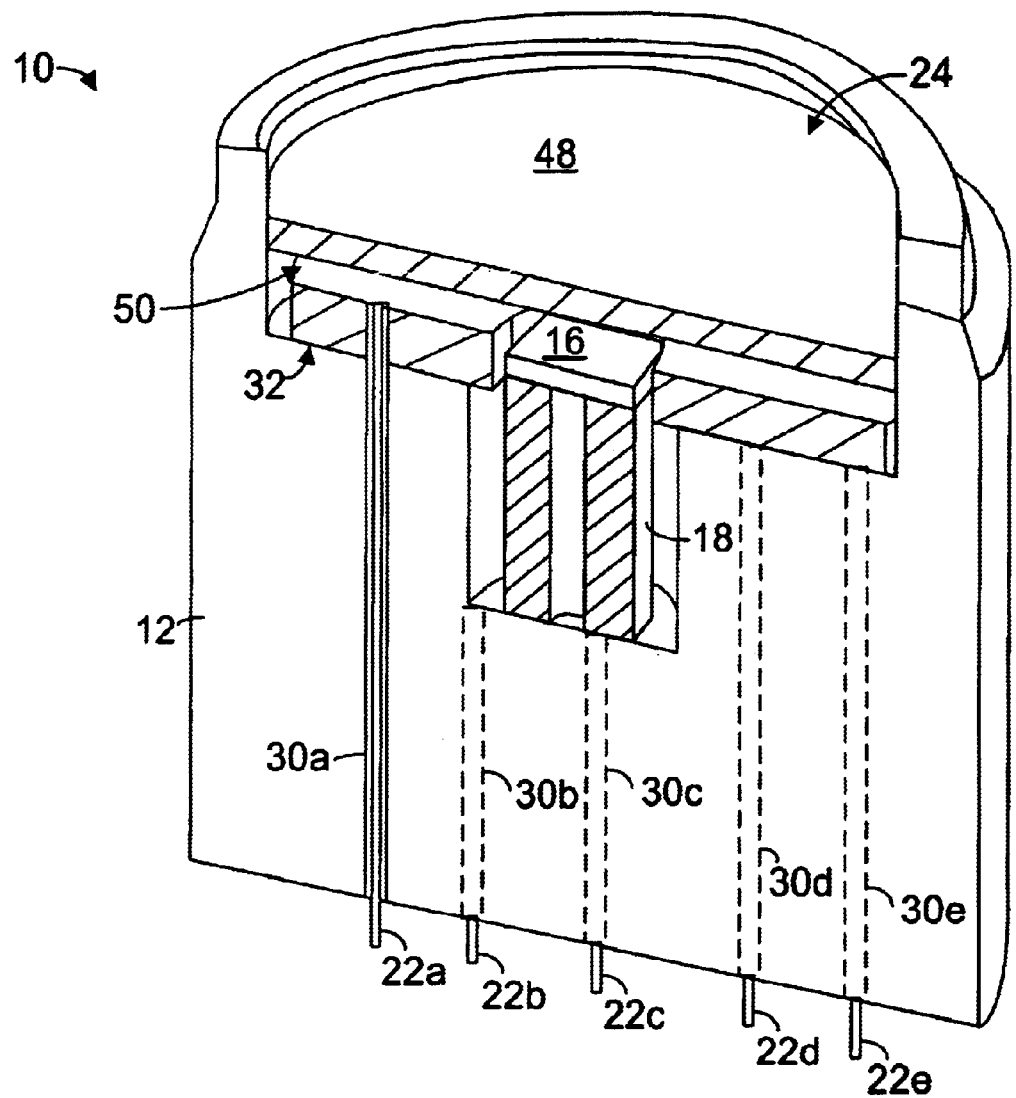
FIG. 5 illustrates one embodiment of a sensor package.

In an alternative exemplary embodiment, the sensor package 10 includes an isolation diaphragm 48 as illustrated in FIG. 5. The isolation diaphragm 48 may be positioned in the recess 24 of the housing 12 over the sealing member 14, or it could completely cover recess 24. The isolation diaphragm 48 may be a thin and flexible metal diaphragm. An area 50 between the isolation diaphragm and the sealing member 14 may be filled with a non-corrosive fluid, such as a silicone fluid, to protect the sensing die 16. For example, the sensor package 10 may be used to detect a pressure applied by an acidic fluid. The acidic fluid can apply a pressure to the isolation diaphragm 48, which in turn transfers the pressure to the silicone fluid. The sensing die 16 may then detect the pressure of the silicone fluid. Additional diaphragms and non-corrosive fluids may be used as well.

Those skilled in the art to which the present invention pertains may make modifications resulting in other embodiments employing principles of the present invention without departing from its spirit or characteristics, particularly upon considering the foregoing teachings. Accordingly, the described embodiments are to be considered in all respects only as illustrative, and not restrictive, and the scope of the present invention is, therefore, indicated by the appended claims rather than by the foregoing description. Consequently, while the present invention has been described with reference to particular embodiments, modifications of structure, sequence, materials and the like apparent to those skilled in the art would still fall within the scope of the invention.

I claim:

1. A sensor package comprising:

a housing having a recess formed therein which defines an interior perimeter and a seal interface surface, the housing having at least one hole extending through the seal interface surface of the housing;

a sealing member sealingly attached within the recess to the seal interface surface, the sealing member positioned to cover the at least one hole, wherein the sealing member includes conductive traces, and the bond wire and the at least one lead are soldered to the conductive traces;

a sensing die positioned within the recess, the sensing die operable to detect a pressure; and at least one lead conductively coupled to the sensing die using a solder connection and extending from the solder connection through the sealing member and through the at least one hole.

2. A sensor package comprising:

a housing having a recess formed therein, the recess defines an interior perimeter and a seal interface surface;

a sealing member sealingly attached within the recess to the seal interface surface; and at least one lead passing through the housing and extending into, without passing through, the sealing member.

3. The sensor package of claim 2, wherein the at least one lead is substantially perpendicular to the seal interface surface.

4. The sensor package of claim 2, wherein the sealing member is sealingly attached to the seal interface surface with an adhesive.

5. The sensor package of claim 4, wherein the adhesive is epoxy.

6. The sensor package of claim 2, wherein the sealing member is a ceramic block.

7. The sensor package of claim 2, further comprising a sensing die positioned within the recess.

8. The sensor package of claim 7, wherein the sensing die detects a pressure.

9. The sensor package of claim 7, wherein the at least one lead is electrically connected to the sensing die.

10. The sensor package of claim 2, wherein the at least one lead passes through a hole defined through the housing that is about 0.020 inches in diameter.

11. The sensor package of claim 10, wherein the hole defined through the housing is formed by electronic discharge machining.

* * * * *